US012704197B2

(12) United States Patent
Kolbenschlag

(10) Patent No.: US 12,704,197 B2
(45) Date of Patent: Aug. 11, 2026

(54) MEASURING DEVICE

(71) Applicant: SAMSON Aktiengesellschaft, Frankfurt am Main (DE)

(72) Inventor: Stefan Kolbenschlag, Darmstadt (DE)

(73) Assignee: SAMSON Aktiengesellschaft (DE)

( * ) Notice: Subject to any disclaimer, the term of this patent is extended or adjusted under 35 U.S.C. 154(b) by 0 days.

(21) Appl. No.: 18/998,809

(22) PCT Filed: Jul. 27, 2023

(86) PCT No.: PCT/EP2023/070858
§ 371 (c)(1),
(2) Date: Jan. 27, 2025

(87) PCT Pub. No.: WO2024/023226
PCT Pub. Date: Feb. 1, 2024

(65) Prior Publication Data

US 2026/0029068 A1 Jan. 29, 2026

(30) Foreign Application Priority Data

Jul. 27, 2022 (DE) ..................... 20 2022 104 260.8

(51) Int. Cl.
*F16K 37/00* (2006.01)
*G01L 3/14* (2006.01)

(52) U.S. Cl.
CPC ...... *F16K 37/0041* (2013.01); *F16K 37/0083* (2013.01); *G01L 3/1435* (2013.01)

(58) Field of Classification Search
CPC . F16K 37/0041; F16K 37/0083; G01L 3/1435
See application file for complete search history.

(56) References Cited

U.S. PATENT DOCUMENTS 4,488,443 A * 12/1984 Parkinson ............... G01L 3/104 73/862.329
4,977,782 A * 12/1990 Stohr .................. F16K 37/0041 73/862.339
5,142,906 A * 9/1992 Smith ................ F16K 37/0041 73/862.627
5,454,273 A * 10/1995 Smith .................. G01L 5/0066 73/168

(Continued)

FOREIGN PATENT DOCUMENTS

DE 10 2014 019 547 B3 5/2016
DE 11 2017 003 008 T5 12/2017

(Continued)

OTHER PUBLICATIONS

WO 2021123445A1—Machine Translation (Year: 2021).*
DE112017003008T5—Machine Translation (Year: 2017).*

*Primary Examiner* — Daphne M Barry
(74) *Attorney, Agent, or Firm* — Frijouf, Rust & Pyle, P.A.

(57) ABSTRACT

The invention relates to a measuring device (10) for recording at least one force and/or torque curve resulting when a control valve (32) is actuated by an actuating drive (34), comprising a housing (11) which can be arranged between the control valve (32) and the actuating drive (34). The housing (11) is provided with a first and a second connecting wall (14, 16) and at least one connecting element (18) which connects the first and the second connecting wall (14, 16). The first connecting wall (14) is connected to the actuating drive (34), and the second connecting wall (16) is connected to the control valve (32). A connecting shaft (12) for connecting a drive shaft of the actuating drive (34) to an actuating shaft of a control valve (32) is arranged in a central through-opening (14*c*, 16*c*) in the two connecting walls (14, 16). The connecting shaft (12) penetrates the measuring (Continued)

device (10). The connecting shaft (12) is arranged at a distance from and freely rotatable with respect to the connecting walls (14, 16), and at least one resilient element is provided between the first connecting wall (14) and the connecting element (18), with a measuring unit being provided in the housing (11). The measuring unit has at least two sub-measuring units. The first sub-measuring unit is in the form of a torque sensor unit, and the second sub-measuring unit is in the form of a rotational-angle sensor unit. The sub-measuring units each have a signal transmitter and a signal receiver. The signal receivers are arranged in a common measuring module (20). The invention is characterized in that the first signal transmitter is arranged on the first connecting wall (14), and the second signal transmitter is arranged on the connecting shaft (12).

24 Claims, 5 Drawing Sheets

(56) References Cited

U.S. PATENT DOCUMENTS

| | | | | |
|---|---|---|---|---|
| 5,533,410 | A * | 7/1996 | Smith | G01L 5/0061 73/862.193 |
| 5,731,529 | A * | 3/1998 | Nicot | G01L 3/104 73/862.321 |
| 9,857,254 | B2 * | 1/2018 | Meuter | G01L 3/108 |
| 2004/0050178 | A1 * | 3/2004 | Parkinson | G01L 3/109 73/862.328 |
| 2016/0178458 | A1 * | 6/2016 | Kolbenschlag | G01L 3/1407 73/862.638 |
| 2022/0099217 | A1 | 3/2022 | Kitchens et al. | |

FOREIGN PATENT DOCUMENTS

| | | |
|---|---|---|
| WO | WO 2018/024496 A1 | 2/2018 |
| WO | WO 2021/123445 A1 | 6/2021 |

* cited by examiner

MEASURING DEVICE

MEASURING DEVICE

This patent application is the national phase entry of PCT/EP2023/070858, international application filing date Jul. 27, 2023, which claims the benefit and priority of and to German patent application no. 20 2022 104 260.8, filed Jul. 27, 2022.

PCT/EP2023/070858, international application filing date Jul. 27, 2023 and German patent application no. 20 2022 104 260.8, filed Jul. 27, 2022 are incorporated herein by reference hereto in their entireties.

BACKGROUND OF THE INVENTION

The invention relates to a measuring device and to a valve assembly.

Control valves are used to control material flows in chemical industry plants, petrochemical plants, power stations and in other areas. They usually have a housing with a valve seat and a movably mounted valve element contained therein. The valve element is guided by a valve rod, with the valve rod being driven by a rotary actuator. The rotary actuator is connected to the valve rod via a coupling element.

Above all for safety control valves, but also for all other valve types, it is advantageous to record and store measurement data during the movement of the valve element using measuring devices. Measuring devices suitable for this purpose are position sensors and/or torque sensors. In this way, a change in the required torque and/or a torque curve can be recorded over time during operation and changes can be detected.

DE°10°2014°019°547°B3 discloses a torque and angle sensor for determining a torque transmitted from a drive part to a driven part.

WO 2018/024496 A1 describes a flange support as a torque measuring system for carrying of a control valve and an actuating drive on both sides. The flange support is connected between the control valve and the actuating drive and measures the supporting forces of the flange support The flange support has spring webs that are soft in the direction of the torque that can be introduced by the actuating drive and hard in other directions of movement, meaning that primarily torques will be measured which the actuating drive transmits to the rod of the valve element. Other forces, such as vibrations and weight forces, only have a negligible influence on the measurement.

Another measurement device for a valve assembly is disclosed in WO 2021/123445 A1, for example.

DE°11°2017°003°008°T5 discloses a torque detection device that measures the torque applied to an articulated component of an industrial robot.

SUMMARY OF THE INVENTION

It is the object of the invention to further develop a measuring device for torque and angle of rotation measurement on a housing that can be arranged between the control valve and the actuating drive in a way that results in a compact and variably usable design and reduces the cabling effort for the sensor system.

This object is accomplished by the characterizing features of claim 1 in conjunction with the features of its preamble, as well as by the features of claim 19.

The dependent claims relate to advantageous further embodiments of the invention.

In a known manner, a measuring device comprises a housing which can be arranged between a control valve and an actuating drive for recording at least one force and/or torque curve that results when the control valve is actuated by the actuating drive. The housing is provided with a first and a second connecting wall and at least one connecting element which connects the first and the second connecting wall. The first connecting wall is connected to the actuating drive, and the second connecting wall is connected to the control valve. A connecting shaft for connecting a drive shaft of the actuating drive to an actuating shaft of the control valve is arranged in a central through-opening in the two connecting walls so that it can rotate about an axis of rotation. The connecting shaft extends through the measuring device. The connecting shaft is arranged at a distance from, and freely rotatable with respect to, the connecting walls. At least one resilient element is provided between the first connecting wall and the connecting element. Furthermore, a measuring unit is provided. The measuring unit has at least two sub-measuring units. The first sub-measuring unit is in the form of a torque sensor unit, and the second sub-measuring unit is in the form of a rotational-angle sensor unit. The sub-measuring units each comprise a signal transmitter in the form of a sample to be scanned, and a signal receiver. The signal receiving elements are arranged in a common measuring module.

This enables compact and space-saving monitoring of the control valve's operation. The measuring device, which is fixedly mounted between the actuating drive or and the control valve, is designed to transmit reaction forces that are created between the housing of the actuating drive and the control valve when the control valve is moved by the actuating drive.

According to the invention, the first signal transmitter is arranged on the first connecting wall, and the second signal transmitter is arranged on the connecting shaft. This is used to monitor the forces acting on the connecting shaft and the first connecting wall, and to measure the angle of rotation of the connecting shaft relative to a connecting wall.

Preferably, the signal transmitter is designed in the form of a sample to be scanned by the signal receiver. Selecting a sample to be scanned allows the resolution of the measuring unit to be easily adjusted depending on the application.

The measuring module is preferably arranged on the connecting element. This ensures that the measuring module is positioned centrally in relation to the connecting shaft and the first connecting wall, which enables simple installation and flexible positioning.

Preferably, the measuring module is arranged between the first and the second connecting wall at a radial distance from the connecting shaft. The measuring module with the respective signal receivers is positioned at a defined distance from the scannable samples. Torque and rotational-angle sensors, among others, can be used as signal receivers. These sensors are positioned in the measuring module in such a way that the respective scannable samples are arranged at a defined distance from each other.

In order to realize high resolution yet at the same time keeping the design small, at least one sub-measuring unit is designed as a magnetic sensor, in particular both sub-measuring units are designed as magnetic sensors.

In a further advantageous embodiment of the invention, the signal transmitter of the rotational-angle sensor unit is designed as a sample to be scanned with at least one magnetic element, such as a pole ring, and the signal receiver is formed by a rotational-angle sensor which detects the magnetic element. Monitoring the angle of rotation of the connecting shaft and the torque that the actuating drive exerts on the housing allows the detection of possible interference from the actuating drive and the control valve.

Preferably, the signal transmitter of the torque sensor unit is designed as a sample to be scanned with at least one magnetic element, and the signal receiver is formed by a torque sensor that detects the magnetic element. This ensures contactless and wear-free detection of the position of the first connecting wall.

Preferably, the resilient element is more resilient in the direction of rotation of the axis of rotation than in the direction of the axis of rotation. The resilient design of the resilient element in the direction of rotation of the axis of rotation largely ensures that the torques induced by the actuating drive are measured and that any other interference effects do not affect the measuring accuracy of the torque sensor.

In another advantageous embodiment of the invention, the resilient element is formed by webs that connect the first connecting wall and the connecting element. The required resilience of the housing can be easily adjusted by designing the resilient element as webs.

Preferably, the webs run radially from the first connecting wall to the connecting means with respect to the axis of rotation. The radial design of the webs minimizes the extent of the housing in the direction of the rotary actuator.

In yet another advantageous embodiment of the invention, the webs run axially from the first connecting wall to the connecting means in parallel with respect to the axis of rotation. The axial design of the webs makes it easy to reduce the footprint of the housing.

Preferably, the first connecting wall and the second connecting wall, in particular also the connecting element, have a corresponding rigidity. This ensures that force can be transmitted to both sides of the housing, with the resilient webs acting to minimize disturbance variables.

In yet another embodiment of the invention, connection openings are provided in the first connecting wall, for connecting the actuating drive to the first connecting wall, and in the second connecting wall, for connecting the control valve to the second connecting wall. Via the connection openings, the actuating drive can be firmly connected to the first connecting wall, and the control valve can be firmly connected to the second connecting wall, in order to ensure good power transmission between the actuating drive and the control valve.

Preferably, the connecting element and the second connecting wall form a base body of a shape that results in an essentially rectangular envelope. This ensures good stability of the base body.

Preferably, the base body has an essentially U-shaped basic form. This allows material to be saved in the production of the housing while still maintaining stability.

In another advantageous embodiment of the invention, the measuring module comprises a circuit board which includes the parts of the sensor units, the measuring transducers, a microcontroller, a memory element, a connecting means, a transmitting means and a communicating means, in particular also an interface. This is a simple and compact way of implementing signal processing and transmission.

In order to achieve a sufficiently fast control, a positioner, in particular an I/P converter and/or a motor controller, is provided in the measuring module.

For broad monitoring of possible malfunctions, the measuring device can have a temperature sensor unit for detecting the temperature, which temperature sensor unit is arranged on the measuring module.

A further aspect of the invention relates to a valve assembly comprising an actuator with an actuator stem, a control valve which can be actuated via a valve rod, and a measuring device. According to the invention, the measuring device is detachably connected to the housing of the actuator and detachably connected to the housing of the control valve, with the measuring device connecting the drive shaft of the actuating drive and the drive shaft of the control valve via the connecting shaft.

Preferably, in valve assemblies with measuring devices according to the invention, which have differently dimensioned actuating drives, control valves and housings of the measuring device, the dimension and design of the measuring module of the valve assemblies is the same in each case. This considerably reduces the production costs for different measuring devices and measuring modules that are always of the same size. The measuring module is designed for different torque ranges of the various actuating drives and different actuating drives. It is also easy to integrate the measuring module into differently dimensioned measuring devices, as the samples to be scanned for angle of rotation and torque detection and the signal receivers have fixed positions and the measuring modules have centering points for fixing them precisely in the measuring device.

Preferably, the footprint A of the measuring module is in the range of 30 mm2≤A≤50 mm2. This makes it possible to use it for standard valve sizes and circuit boards without unnecessarily increasing the installation space.

In another advantageous embodiment of the invention, the positioning of the signal transmitter to the signal receiver of each valve assembly is the same in each case. This means that the measuring unit can be calibrated and used in the same way for different valve assemblies.

Preferably, the signal receiver is designed as a pole ring, in which the number of poles is constant, regardless of the dimensions of the housing and of the connecting shaft of the measuring device. The resolution of the angle range is therefore always the same. The pole ring is dimensioned differently so that its positioning in relation to the rotational-angle sensor remains the same. The outer diameter of the pole ring is adapted to the size of the housing of the measuring device and to the distance from the rotational-angle sensor. The inner diameter of the pole ring is adapted to the diameter of the connecting shaft, which diameter varies for different torque measuring ranges.

In order to be able to bear the torques of differently dimensioned actuating drives, control valves and housings of the measuring device, the webs are designed in such a way that the measurable deflection of the webs is almost the same. The sensor travel characteristic and thus the deflection of the webs, remain unchanged. The webs have different dimensions and are adapted to the torque ranges of the various measuring devices. A measuring range adapted to the dimensions of the respective measuring device is stored in the measuring transducer of the measuring device in order to be able to output the appropriate torque range.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below.

DESCRIPTION OF THE INVENTION

Figure 1:
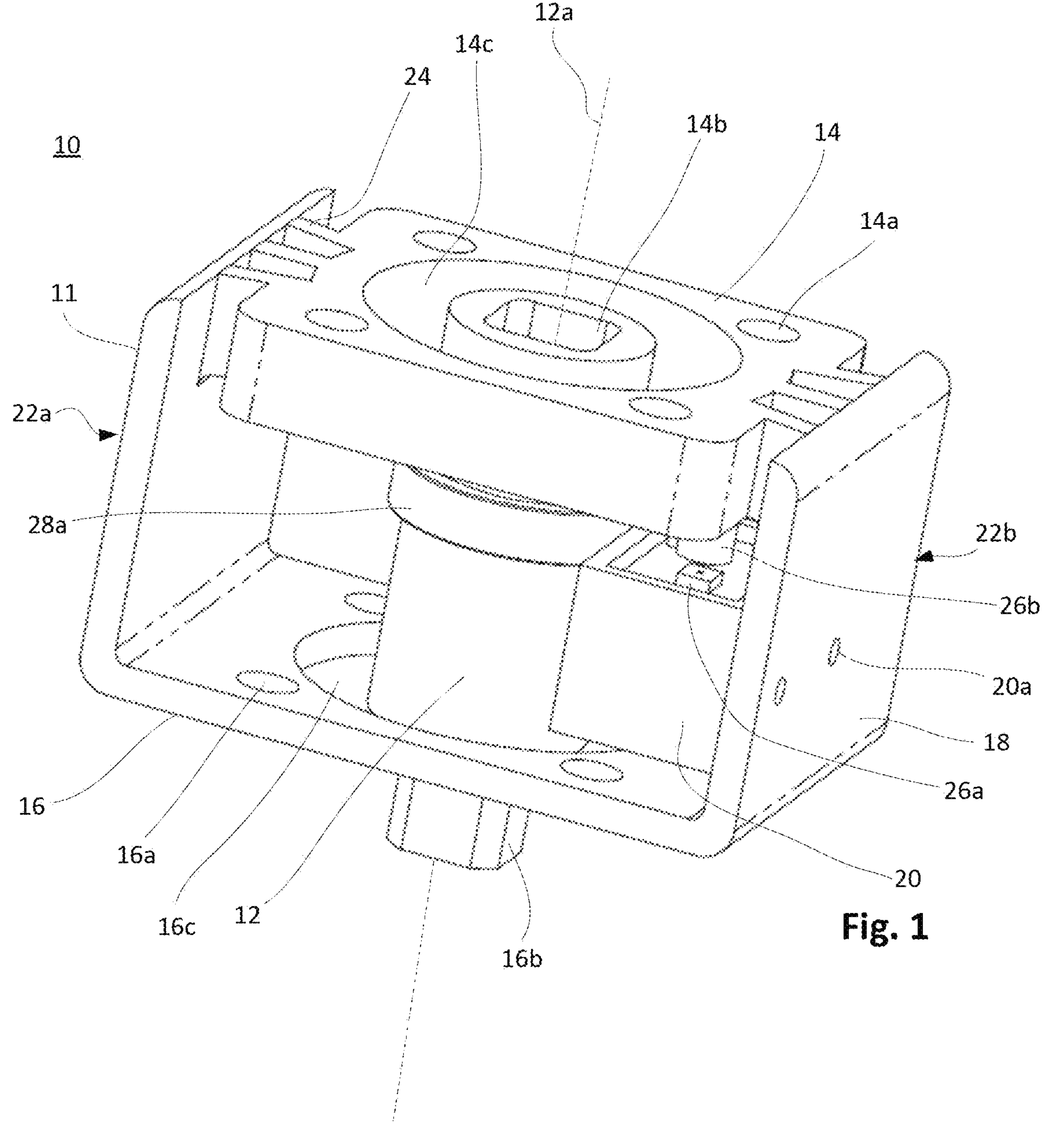
FIG. 1 is a perspective view of a first embodiment of a measuring device with a measuring module according to the invention.

FIGS. 1 to 5 are views of a measuring device 10 according to the invention, having a housing 11, a connecting shaft 12, a first connecting wall 14, a second connecting wall 16 and a connecting element 18 that connects the connecting walls.

The housing 11 has an essentially cuboid shape. The connecting shaft 12 is cylindrical and passes through the housing 11 in the lower area in the second connecting wall 16.

FIG. 1 is a perspective view of a first embodiment of the measuring device 10 according to the invention with a housing 11 and a measuring module 20. The housing 11 comprises a first connecting wall 14 arranged at the top and a second connecting wall 16 arranged at the bottom. Four connection mounts 14*a* and a central shaft mount 14*b* are provided in the first connecting wall 14. The second connecting wall 16 has several connecting mounts 16*a* and a shank 16*b*. The connecting wall 16 is provided with two opposing, laterally fixed connecting walls 22*a*, 22*b*. The connecting walls 22*a*, 22*b* and the connecting wall 16 are made from the same material and in one piece. The connecting wall 14 is connected to the connecting walls 22*a*, 22*b* and thus to the connecting wall 16 in the upper area, via webs 24.

The connecting element 18 consists of the webs 24 and the connecting walls 22*a*, 22*b*.

The connection mounts 14*a*, 16*a* are designed to accommodate an actuating drive 34 or a control valve 32. Furthermore, the first connecting wall 14 and the second connecting wall 16 each have an opening 14*c*, 16*c* for the connecting shaft 12, on the one hand for connecting the drive shaft of the actuating drive 34 and on the other hand for connection to the actuating shaft of the control valve 32.

The measuring device 10 has six webs 24, with the first connecting wall 14 being connected to the first connecting wall 22*a* via three webs 24 each and to the second connecting wall 22*b* via three webs 24 each.

The second connecting wall 16 and the connecting walls 22*a*, 22*b* form a U-shape.

The connecting walls 22*a*, 22*b* run parallel in the direction of the axis of rotation 12*a*. The webs 24 run radially in relation to the axis of rotation 12*a*. The webs 24 are more resilient in the direction of rotation of the axis of rotation 12*a* than in the direction along the axis of rotation 12*a*.

For positive coupling of the drive shaft and the actuating shaft to the connecting shaft 12, square connections are provided as a mount 14*b* or as a shank 16*b*, in which the shape-complementary ends of the drive shaft and the actuating shaft engage, thus creating a non-rotating connection.

The measuring module 20 is arranged on the second connecting wall 22*b* and is firmly connected to the second connecting wall 22*b* via two connection mounts 20*a*. The measuring module 20 is cuboid in shape. It has a torque sensor 26*a* on the side facing the first connecting wall 14. On the opposite side and at a distance, a pointer 26*b* with a permanent magnet 26*c* is arranged on the first connecting wall 14. The resilient webs 24 are located between the first connecting wall 14 and the connecting wall 22*b*, which webs 24 will deform when a drive torque is applied to the actuating shaft, which deformation can be sensed by means of a change in displacement by means of the permanent magnet 26*c* on the pointer 26*b* relative to the torque sensor 26*a* of the measuring module 20 on the connecting wall 22*b* and a resulting change in the magnetic field line orientation or a magnetic force.

The measuring module 20 is arranged centrally between the first connecting wall 14 and the second connecting wall 16.

The pole ring 28*a* partially surrounds the connecting shaft 14 in the area of the measuring module 20.

Figure 5:
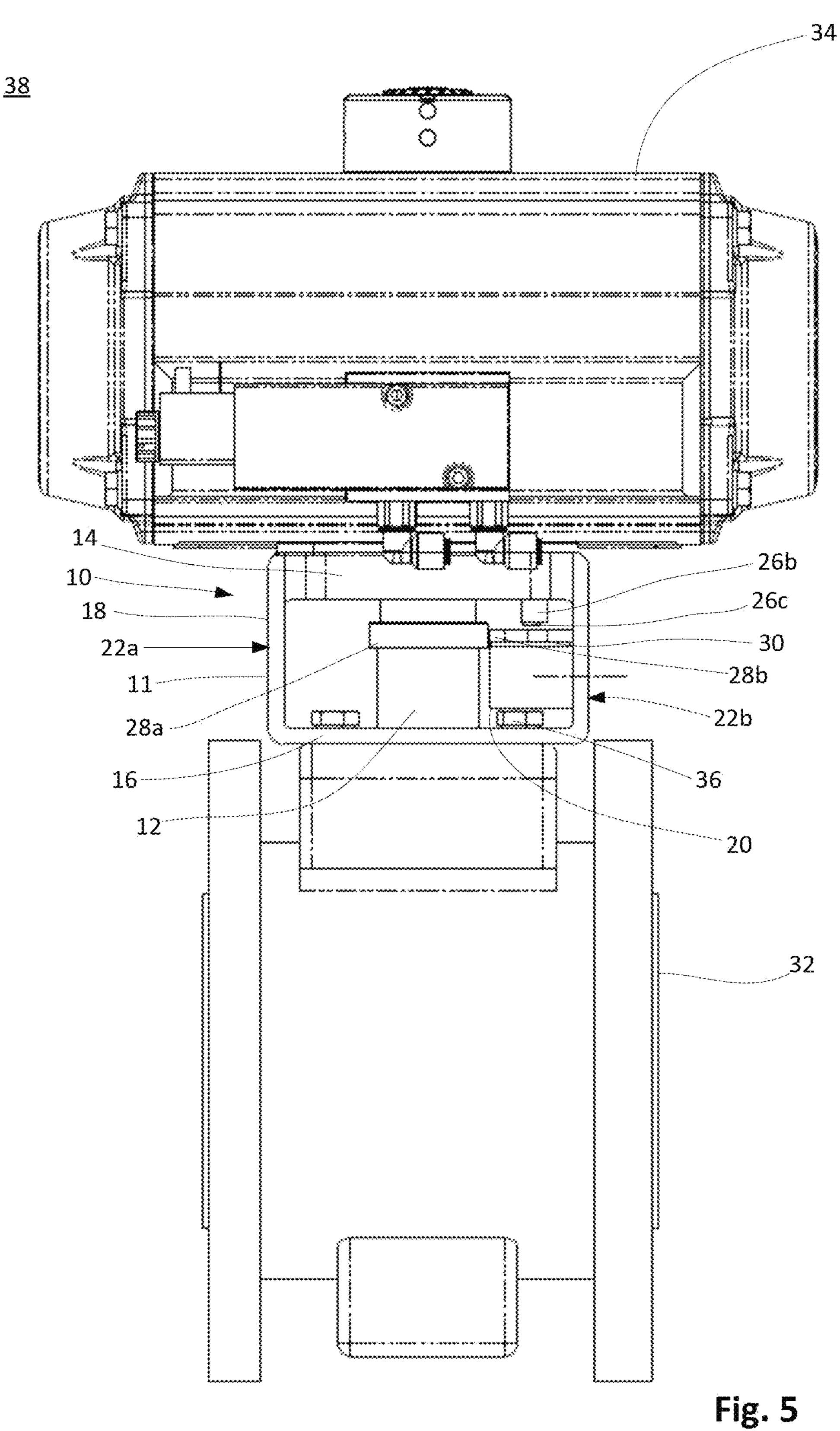
FIG. 5 is a side view of a control valve with integrated measuring device according to the embodiment of FIG. 1 with a measuring housing and an actuating drive.

The connection mounts 14*a* of the first connecting wall 14 are used to connect the measuring device 10 to the actuating drive 34 using connecting elements, see FIG. 5. The connection mounts 16*a* of the second connecting wall 16 are provided for connection to the control valve 32 by connecting elements of the measuring device 10.

The measuring device 10 has a temperature sensor unit (not shown in detail here) for detecting the temperature. The temperature sensor unit is located on the measuring module 20.

Figure 2:
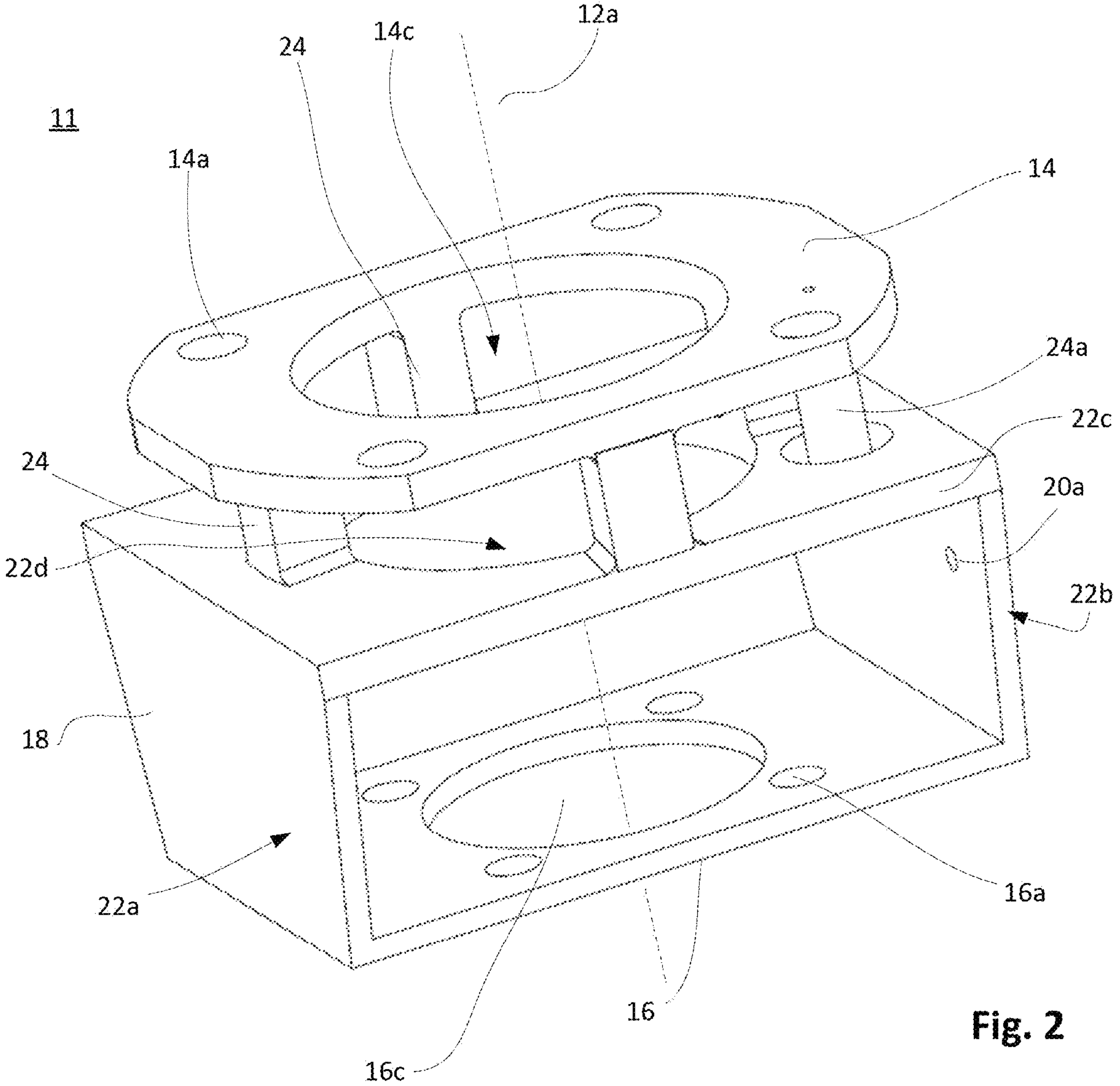
FIG. 2 is a perspective view of a second embodiment of a part of a measuring device according to the invention.

FIG. 2 is a perspective view of a second embodiment of the housing 11 according to the invention.

For the sake of clarity, the housing 11 has neither a measuring module 20 nor a connecting shaft 12.

The housing 11 essentially has a cuboid basic shape. The second connecting wall 16 is longer. On the side, the second connecting wall 16 is provided with the connecting walls 22*a*, 22*b*. On the side remote from the second connecting wall 16, an intermediate connecting wall 22*c* connects the connecting walls 22*a*, 22*b*. The first connecting wall 14 is connected to the intermediate connecting wall 22*c* via the connecting walls 22*a*, 22*b* and the second connecting wall 16 by means of webs 24 extending parallel to the axis of rotation 12*a* away from the intermediate connecting wall 22*c* and the second connecting wall 16.

The intermediate connecting wall 22*c* is firmly connected to the connecting walls 22*a*, 22*b* and has a central through-opening 22*d*. The through-opening 22*d* is aligned with the connecting shaft mount 14*b*. The webs 24 are each arranged on the intermediate connecting wall 22*c* and each terminate on one side with the through-opening 22*d.*

In this embodiment, the webs 24 run axially in the direction of the axis of rotation 12*a.*

The web 24*a* is also designed as a pointer 26*b* of a torque sensor.

In this embodiment, the connecting element 18 consists of the webs 24, the connecting walls 22*a*, 22*b* and the intermediate connecting wall 22*c.*

Figures 3A, 3B:
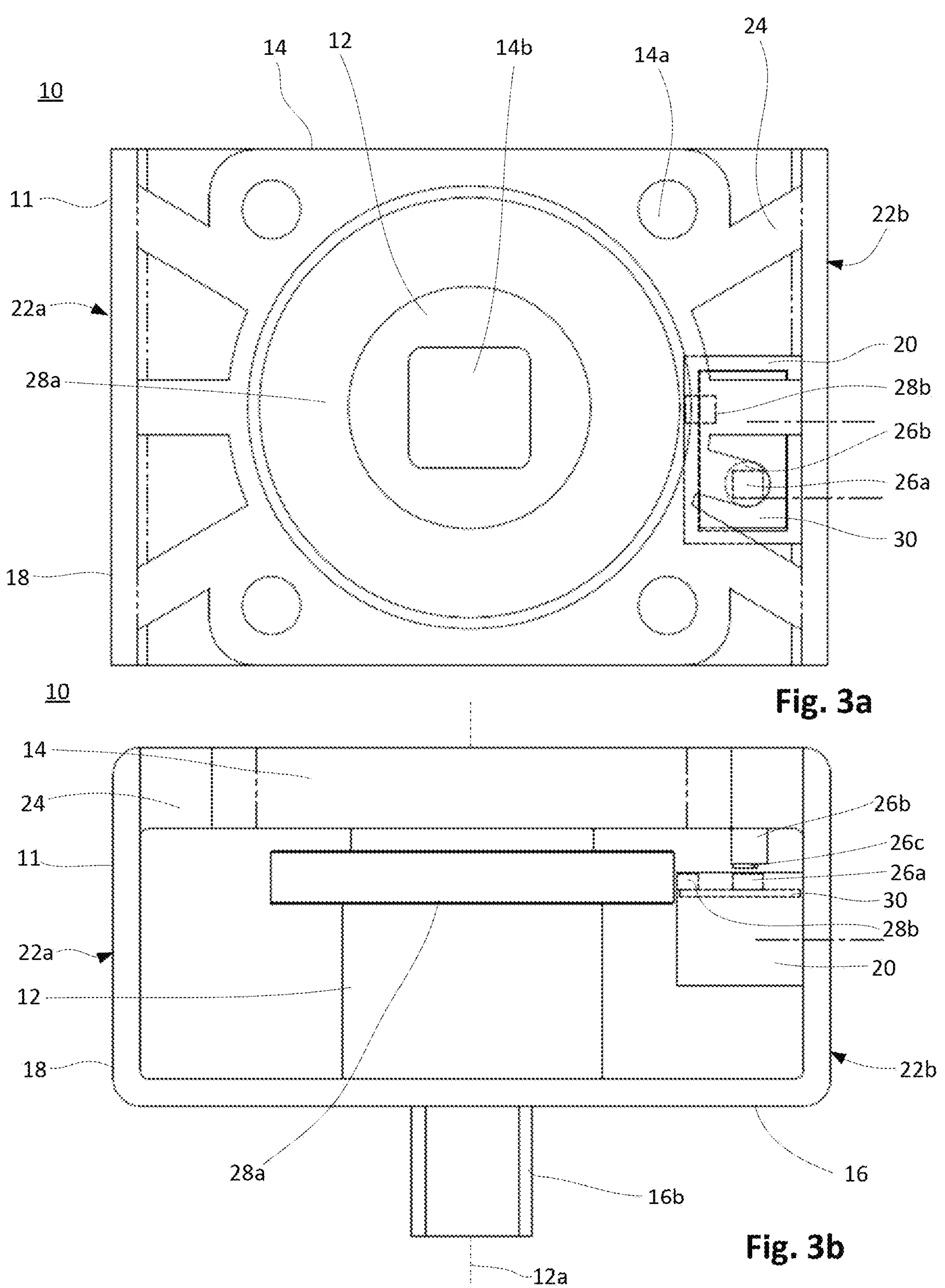
FIG. 3*a* is a top view of the measuring device of FIG. 1.
FIG. 3*b* is a side view of the measuring device of FIG. 3*a;*

FIG. 3*a* is a top view of the measuring device of FIG. 1.

The connecting shaft openings 14*c* are centrally formed and are centric to the connecting shaft 12. The pole ring 28*a* surrounds the connecting shaft 12. The first connecting wall 14 is arranged around the pole ring 28*a*. This wall 14 is connected to the connecting walls 22*a*, 22*b* via the webs 24.

The measuring module 20 is mounted on the second connecting wall 22*b* on the right-hand side. The measuring module 20 has a torque sensor 26*a* and a rotational-angle sensor 28*b*. The rotational-angle sensor 28*b* is designed as a magnetic sensor. Both sensors 26*a*, 28*b* are located on a circuit board 30 in the area of the upper side of the measuring module 20 facing the first connecting wall 14. It is indicated in the drawing that a permanent magnet 26*c* is attached to the pointer 26*b* centrally above the torque sensor 26*a*. The rotational-angle sensor 28*b* is flush with the side of the measuring module 20 facing the pole ring 28*a*. A minimum distance is provided between pole ring 28*a* and rotational-angle sensor 28*b* in order not to impair the rotational movement of the connecting shaft 12.

The circuit board 30 further comprises a measuring transducer, a microcontroller, a memory element, a connecting means, a transmitting means and a communicating means, in particular also an interface.

A positioner, in particular an I/P converter and/or a motor controller, is provided in the measuring module 20.

The positioning of the signal transmitters, i.e. of the pointer 26*b* and the pole ring 28*a*, in relation to the signal receivers, i.e. the rotational-angle sensor 28*b* and the torque sensor 26*a*, of each differently dimensioned measuring device 10 is the same in each case.

The number of poles of the pole ring 28*a* is constant, regardless of the dimensions of the actuating drive 34, control valve 32 and housing 11 of the measuring device 10.

FIG. 3*b* is a side view of the measuring device 10 of FIG. 3*a*.

The torque sensor 26*a* is mounted on the pointer 26*b* below the permanent magnet 26*c*. A gap can be seen between the torque sensor 26*a* and the permanent magnet 26*c*, so that the deformation of the webs 24 can be measured without contact when a torque is applied.

The pole ring 28*a* surrounds the connecting shaft 12 centrally and is firmly connected to it.

Below the second connecting wall 16, the shank 16*b* protrudes from the connecting shaft opening 16*c* of the second connecting wall 16.

Figure 4A:
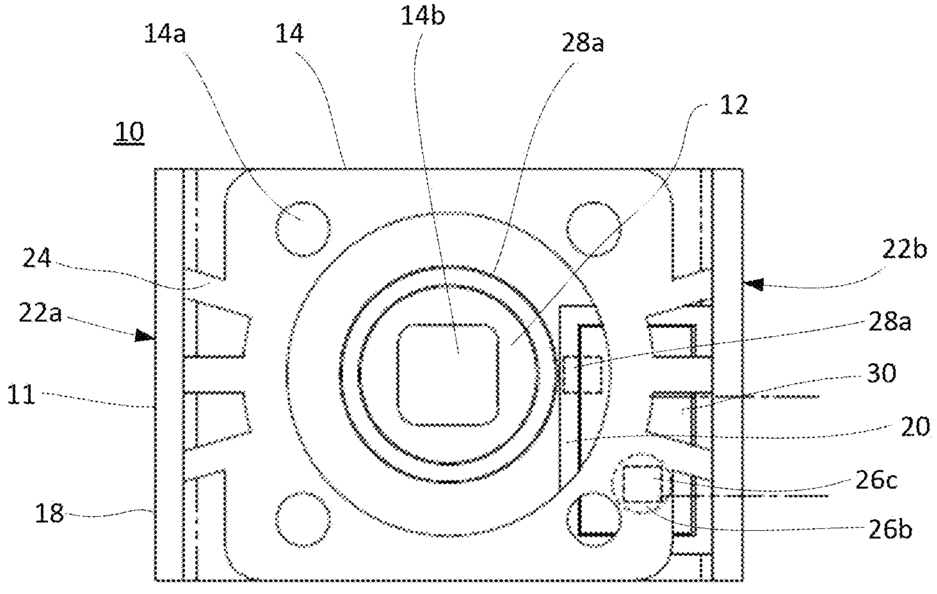
FIG. 4*a* is a top view of the measuring device of FIG. 1 of small dimensions.

FIG. 4*a* is a top view of the measuring device of FIG. 1. In this case, the housing 11 and the connecting shaft 12 as well as the pole ring 28*a* have different dimensions than in FIG. 3*a*. The dimensions of the measuring module 20 are the same as in FIG. 3*a*.

The footprint A of the measuring module 20 is in the range of greater than or equal to 30 mm2 and less than or equal to 50 mm2. The positioning of the pole ring 28*a* in relation to the rotational-angle sensor 28*b* remains the same for all sizes of measuring devices 10. The centering on the connecting wall 22*b* is always arranged in such a way that the measuring module 20 maintains this position without any additional manual adjustment. The pole ring 28*a* always has the same number of poles, even for different outer diameters of the connecting shaft 12. In this way, the resolution per degree of angle is the same for all dimensions of the housing 11 and connecting shafts 12 of the measuring device 10, and no adjustment of the resolution and the characteristic curve is required for the electronics.

Figure 4B:
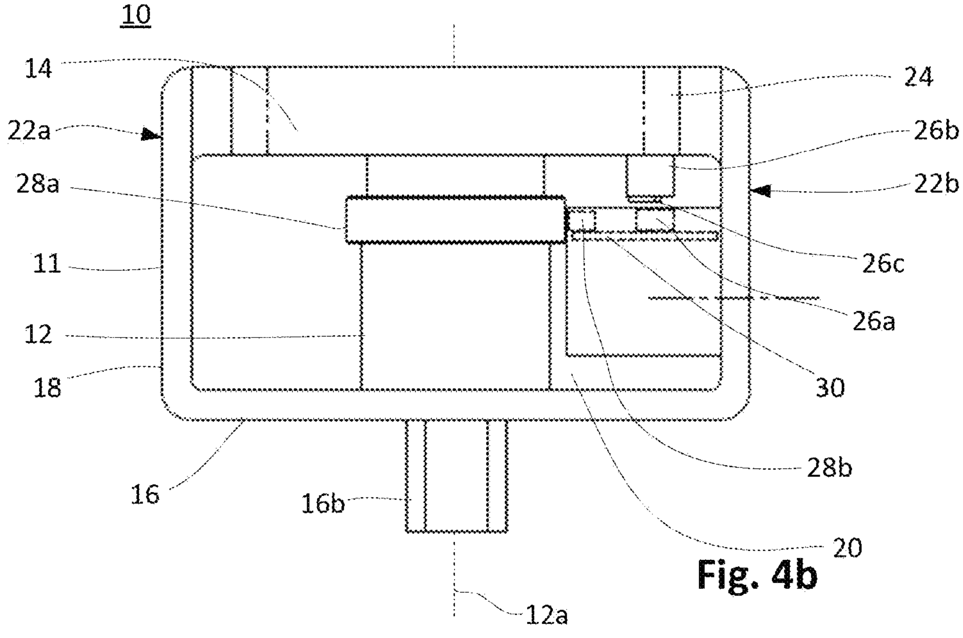
FIG. 4*b* is a side view of the measuring device of FIG. 4*a*.

FIG. 4*b* is a side view of the measuring device of FIG. 4*a*.

The positioning of the torque sensor 26*a* in relation to the pointer 26*b* remains the same for all sizes of measuring devices 10. The centering on the connecting wall 22*b* is always arranged in such a way that the measuring module 20 maintains this position without any additional manual adjustment. The webs 24 are designed in such a way that the deflection of the webs 24 is always the same for the intended nominal load, maximum load of the respective measuring device. The webs 24 are therefore designed to be correspondingly larger for higher nominal loads. In this way, the characteristic curve for the deflection is the same for all dimensions of the actuating drives 34, control valves 32 and housing 11 of the measuring device 10. Only a single factor for the intended nominal load needs to be stored in the electronics of the measuring module 20. The deflection measured via the magnet system is multiplied by a factor in order to output the appropriate force curve.

FIG. 5 is a side view of a control valve assembly 38 consisting of a control valve 32 of the installed measuring device 10 with the measuring housing 20 and an actuating drive 34.

The measuring device 10 is detachably connected to the control valve 32 on the second connecting wall 16 via screw connections 36. The measuring device 10 is detachably connected to the actuating drive 34 at the first connecting wall 14. The actuating drive 34 engages in the shaft mount 14*b* of the first connecting wall 14 and transmits a torque to the connecting shaft 12. The shank 16*b* of the second connecting wall 16 is connected to the control valve 32 in a drive-locked manner meaning that the torque is transmitted from the actuating drive 34 to the control valve 32 via the connecting shaft 12.

The measuring device 10 makes it possible to monitor the status of these components 32, 34 of a control valve assembly 38 with little cabling and production effort for differently dimensioned control valves 32 and actuating drives 34. The torque sensor 26*a* records a torque curve which is compared with a reference curve. The angle of rotation of a valve element in the control valve 32 is monitored by the rotational-angle sensor 28*b*. This allows an error message to be issued if the actuating drive 34 or the control valve 32 is in a critical state, in order to prevent complete failure of the components 32, 34.

LIST OF REFERENCE SIGNS

- 10 measuring system
- 11 housing
- 12 connecting shaft
- 12*a* axis of rotation of connecting shaft 12
- 14 first connecting wall
- 14*a* connection mount of first connecting wall 14
- 14*b* shaft mount of first connecting wall 14
- 14*c* connecting shaft opening in first connecting wall 14
- 16 second connecting wall
- 16*a* connection mount of second connecting wall 16
- 16*b* shank of second connecting wall 16
- 16*c* connecting shaft opening in first connecting wall 16
- 18 connecting element
- 20 measuring module
- 22*a* first connecting wall
- 22*b* second connecting wall
- 22 intermediate connecting wall
- 24 web
- 24*a* web with pointer 26*b*
- 26*a* torque sensor
- 26*b* pointer
- 26*c* permanent magnet
- 28*a* pole ring
- 28*b* rotational-angle sensor
- 30 circuit board
- 32 control valve
- 34 actuating drive
- 36 screw connection
- 38 control valve assembly

The invention claimed is:

1. Measuring device (10) for recording at least one force and/or torque curve resulting when a control valve (32) is actuated by an actuating drive (34), which measuring device comprises a housing (11) which can be arranged between the control valve (32) and the actuating drive (34) and is provided with a first and a second connecting wall (14, 16) and at least one connecting element (18) which connects the first and second connecting walls (14, 16), with the first connecting wall (14) being connected to the actuating drive (34), and the second connecting wall (16) being connected to the control valve (32), with a connecting shaft (12) for connecting a drive shaft of the actuating drive (34) to an actuating shaft of a control valve (32) being arranged in a central through-opening (14*c*, 16*c*) in the two connecting walls (14, 16), with the connecting shaft (12) passing through the measuring device (10), wherein the connecting shaft (12) is arranged at a distance from, and freely rotatable with respect to, the connecting walls (14, 16), and at least one resilient element is formed by webs is provided between the first connecting wall (14) and the connecting element (18), wherein a measuring unit is provided in the housing (11), which measuring unit has at least two sub-measuring units, with the first sub-measuring unit being in the form of a torque sensor unit and the second sub-measuring unit being in the form of a rotational-angle sensor unit, with the sub-measuring units each comprising a signal transmitter and a signal receiver, and which signal receivers are arranged in a common measuring module (20), characterized in that the first signal transmitter is arranged on the first connecting wall (14), and the second signal transmitter is arranged on the connecting shaft (12).

2. Measuring device according to claim 1, characterized in that the signal transmitter is in the form of a sample to be scanned by the signal receiver.

3. Measuring device according to claim 2, characterized in that the signal transmitter of the rotational-angle sensor unit is in the form of a sample to be scanned with at least one magnetic element, such as a pole ring (28*a*), and the signal receiver is constituted by a rotational-angle sensor (28*b*) that detects the magnetic element.

4. Measuring device according to claim 2, characterized in that the signal transmitter of the torque sensor unit is in the form of a sample to be scanned with at least one magnetic element (26*c*), and the signal receiver is constituted by a torque sensor (26*a*) that detects the magnetic element (26*c*).

5. Measuring device according to claim 1, characterized in that the measuring module (20) is arranged on the connecting element (18).

6. Measuring device according to claim 1, characterized in that the measuring module (20) is arranged between the first and second connecting walls (14, 16) centrally and at a radial distance from the connecting shaft (12).

7. Measuring device according to claim 1, characterized in that at least one sub-measuring unit, in particular both sub-measuring units, is/are designed as magnetic sensors.

8. Measuring device according to claim 1, characterized in that the resilient element is more resilient in the direction of rotation of the axis of rotation (12*a*) than in the direction of the axis of rotation (12*a*).

9. Measuring device according to claim 8, characterized in that the resilient element is formed by webs (24) that connect the first connecting wall and the connecting element.

10. Measuring device according to claim 9, characterized in that the webs (24) extend radially from the first connecting wall (14) to the connecting means (18) with respect to the axis of rotation (12*a*).

11. Measuring device according to claim 9, characterized in that the webs (24) extend axially from the first connecting wall (14) to the connecting means (18) in parallel with respect to the axis of rotation (12*a*).

12. Measuring device according to claim 1, characterized in that the first connecting wall (14) and the second connecting wall (16), in particular also the connecting element (18), are of a mutually corresponding rigidity.

13. Measuring device according to claim 1, characterized in that connection openings (14*a*, 16*a*) are provided in the first connecting wall (14), for connecting the actuating drive (34) to the first connecting wall (14), and in the second connecting wall (16), for connecting the control valve (32) to the second connecting wall (16).

14. Measuring device according to claim 1, characterized in that the connecting element (18) and the second connecting wall (16) form a base body which has a shape that results in a substantially rectangular envelope.

15. Measuring device according to claim 14, characterized in that the base body has an essentially U-shaped basic form.

16. Measuring device according to claim 1, characterized in that the measuring module (20) comprises a circuit board (30) which includes the parts of the sensor units, the measuring transducers, a microcontroller, a memory element, a connecting means, a transmitting means and a communicating means, in particular also an interface.

17. Measuring device according to claim 1, characterized in that a positioner, in particular an I/P converter and/or a motor controller, is provided in the measuring module (20).

18. Measuring device according to claim 1, characterized in that the measuring device (10) has a temperature sensor unit for detecting the temperature, which temperature sensor unit is arranged on the measuring module (20).

19. Valve assembly (38) comprising an actuating drive (34) with a drive rod, a control valve (32) which can be actuated via a valve rod, and a measuring device (10) according to any one of the preceding claims, characterized in that the measuring device (10) is detachably connected to the housing of the actuating drive (34) and is detachably connected to the housing of the control valve (32), with the measuring device (10) connecting the drive shaft of the actuating drive (34) and the drive shaft of the control valve (32) via the connecting shaft (12).

20. Plural valve assemblies according to claim 19, which have differently dimensioned actuating drives, control valves and housings of the measuring device, characterized in that the dimension and the design of the measuring module (20) of the valve assemblies (38) are the same in each case.

21. Valve assemblies according to claim 20, characterized in that the base area A of the measuring module (20) is in the range of 30 mm2≤A<=50 mm2.

22. Valve assemblies according to claim 20, characterized in that the positioning of the signal transmitter relative to the signal receiver of each valve assembly (38) is identical in each case.

23. Valve assemblies according to claim 20, characterized in that the signal receiver is designed as a pole ring (28*a*), with the number of poles being constant, irrespective of the dimensions of the actuating drive (34), the control valve (32) and the housing (11) of the measuring device (10).

24. Measuring device according to claim 20, characterized in that the webs (24) are designed in such a way that, due to different dimensioning, the deflection of the webs (24) is almost the same for different nominal loads and maximum loads.

* * * * *